United States Patent [19]

Staats, Jr.

[11] Patent Number: 5,102,178
[45] Date of Patent: Apr. 7, 1992

[54] CARRYING DEVICE

[76] Inventor: Roy Staats, Jr., 4711 West Ave., L-4, Lancaster, Calif. 93536

[21] Appl. No.: 640,111

[22] Filed: Jan. 11, 1991

[51] Int. Cl.⁵ .............................................. B65D 63/18
[52] U.S. Cl. .................................. 294/152; 294/156; 294/157
[58] Field of Search ................ 294/74, 147, 149–157, 294/164, 165, 167, 168

[56] References Cited

U.S. PATENT DOCUMENTS

| | | | |
|---|---|---|---|
| 466,670 | 1/1892 | Fler | 294/152 |
| 1,118,519 | 11/1914 | Weaver | 294/152 |
| 2,508,795 | 5/1950 | Nielsen | 294/152 |
| 2,514,098 | 7/1950 | Shreiner | 294/74 X |
| 3,214,072 | 10/1965 | Brown | 294/152 |
| 4,119,250 | 10/1978 | Brutlag | 294/149 |
| 4,431,226 | 2/1984 | Weilert | 294/152 X |
| 4,469,363 | 9/1984 | Kalla | 294/154 |
| 4,521,045 | 6/1985 | Hart | 294/152 X |
| 4,553,780 | 11/1985 | Strachan | 294/152 |
| 4,586,745 | 5/1986 | Shepard | 294/151 X |

FOREIGN PATENT DOCUMENTS 214037 4/1924 United Kingdom ................ 294/152

Primary Examiner—Johnny D. Cherry
Attorney, Agent, or Firm—Dennison, Meserole, Pollack & Scheiner

[57] ABSTRACT

A carrying device including an elongate flexible cord folded to define two cord lengths with a rigid tubular handle slidably mounted at the bight portion of the cord lengths. The cord lengths are alternately engaged through opposed ends of the intermediately rigid tubular supports, crossing within each support, and extending beyond the supports through the opposed ends of a second handle. The supports and second handle slidably adjust along the carrying device with the length of the carrying device fixed by a knot between the end portions of the lines beyond the second handle.

14 Claims, 2 Drawing Sheets

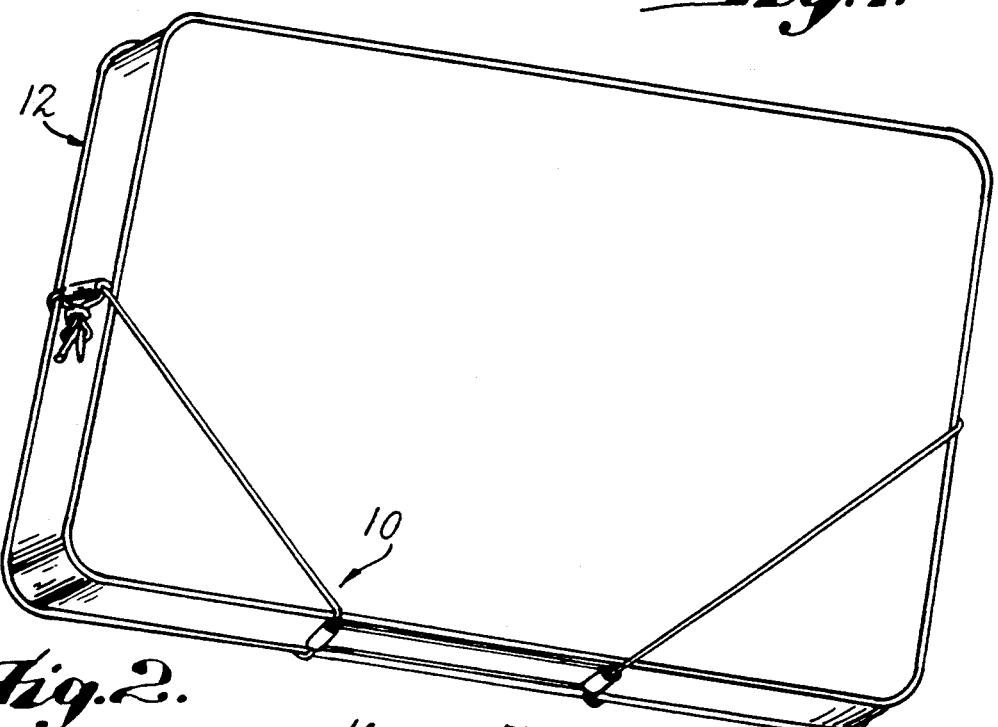
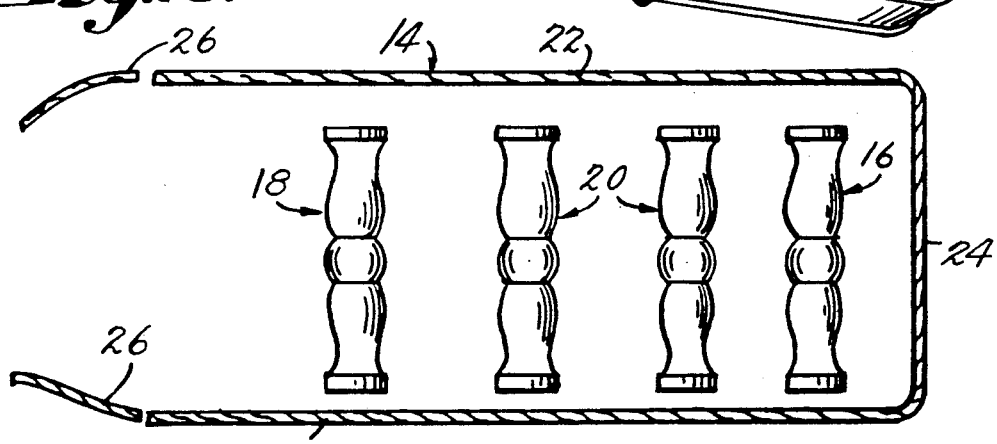
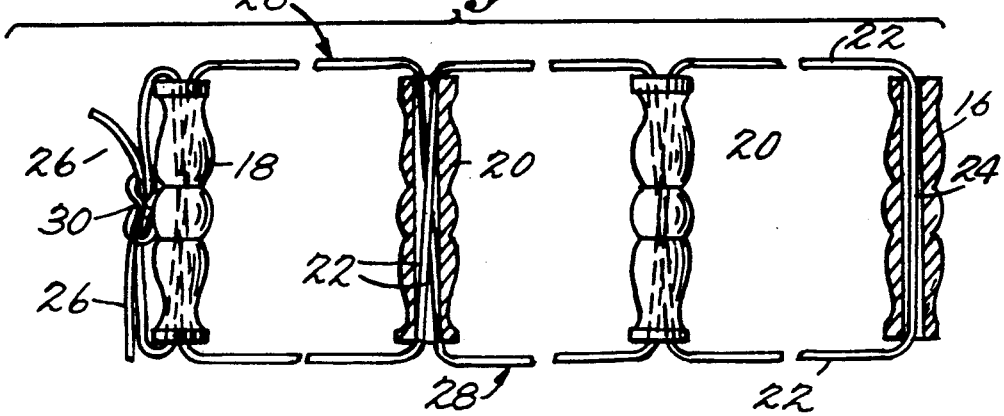

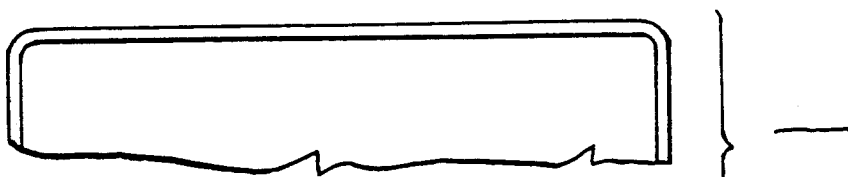
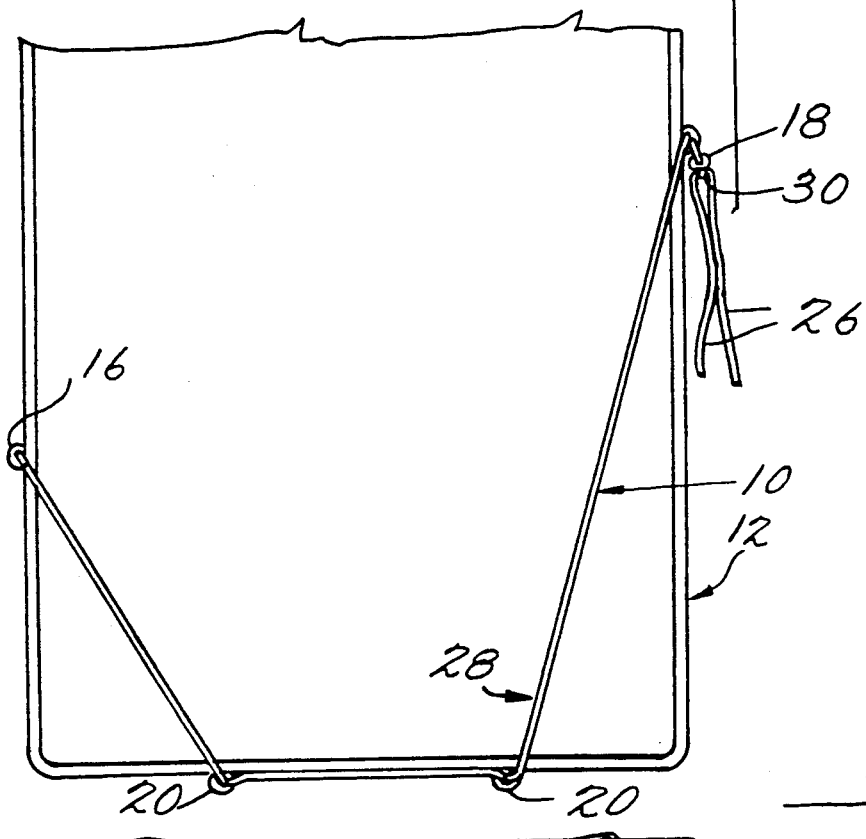
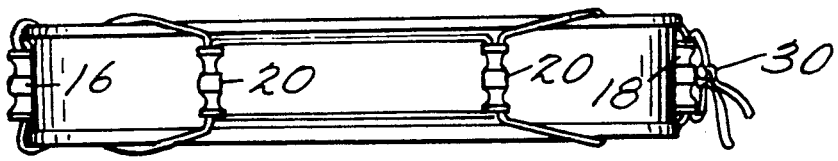
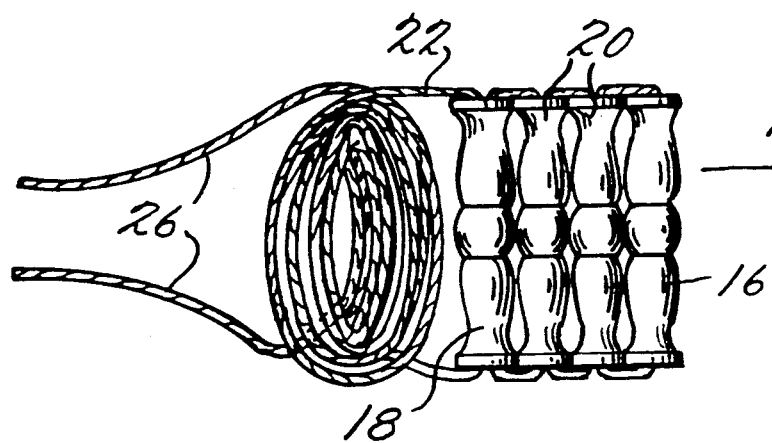

1

CARRYING DEVICE

BACKGROUND OF THE INVENTION

The present invention relates to a carrying device specifically for use in the carrying of mattresses, box springs and like items.

The difficulties in the handling of mattresses and box springs, both by professional movers and homeowners are well known and apparent to anyone faced with the task of moving a mattress whether the move consists of delivery to the home or a moving of the mattress within the home itself by the homeowner.

Such difficulties arise both from the weight of the item and the bulk or size thereof, particularly in the larger queen and king size mattresses.

In order to facilitate the carrying of mattresses, a variety of different types of carrying devices have been devised as suggested in the following patents:

| | |
|---|---|
| 2,508,795 | Nielsen |
| 3,214,072 | Brown |
| 4,119,250 | Brutlag |
| 4,431,226 | Weilert |
| 4,521,045 | Hart |
| 4,553,780 | Strachan |

The patent to Brown is of interest in disclosing a basic carrying sling comprising a pair of elongate end loops joined centrally along the sling with each loop having the strands thereof interconnected by a fixed position flexible strip. The outer ends of the loops comprise the hand holds, and the length of the sling can be adjusted by wrapping the material of the loops about the hand. No separate handles are provided nor is any provision made for adjusting the position of the cross strips as might be desired in accommodating mattresses of different sizes or lengths.

The remainder of the patents listed above are all directed to more elaborate carrying devices including means for actually enclosing all or a portion of the mattress in conjunction with the provision of hand holds and/or elaborate strap devices which are temporarily mounted to the mattress to similarly provide hand holds.

SUMMARY OF THE INVENTION

The mattress carrying device of the invention is structurally unique and provides significant and particularly useful advantages, derived from the structural uniqueness, not heretofore available in the known prior art devices.

More particularly, the carrying device, which is basically in the nature of a sling, is fully adjustable not only in the overall length thereof, but also in the positioning of the handles relative to the intermediate supports and the positioning of the supports relative to each other without limit along the full effective length of the device.

This unlimited adjustability allows for the accommodation of a wide range of different size loads, normally mattresses and box springs. Further, the ability to adjust the handles themselves relative to the supports is particularly advantageous both in maintaining a level load regardless of variations in the respective heights of the persons carrying the load, and also while traversing stairs as is frequently necessary in a home environment.

The adjustability of the carrying device is also such as to enable a complete and uniform collapsing of the device into a small hand-held unit which can be easily stored in one's pocket, in a dresser drawer, tool chest, or the like.

A further object of the invention is to provide for rigid or substantially rigid handles which adjustably mount to the flexible components of the carrying device to provide for comfortable grasping by the hand of one carrying the load, thus avoiding the awkwardness and discomfort inherently associated with the grasping of flexible cord or strap loops as normally required in carrying devices of this general type.

The supports, which extend transversely between the flexible line runs, are also rigid or substantially rigid to both maintain the desired spacing of the line runs relative to each and to provide a stable support for the load.

Structurally, the mattress carrying device of the invention comprises a flexible line or cord, for example ⅜ inch diameter Nylon rope, two elongate hollow, tubular handles, and a plurality, normally two, of elongate hollow, tubular supports. The flexible cord, in a preferred embodiment of the invention, will be approximately 21 feet long. The handles and supports, which are similarly formed of an appropriate plastic or synthetic resinous material, will be approximately 3⅝ inches long with a 9/16 inch outside diameter and a ⅜ inch inside diameter.

The cord is folded in half, forming an open ended loop. The first handle has the cord positioned through the hollow interior thereof with the handle located at the bight of the loop, spreading the two lengths of the loop and providing a fixed length hand grip which may, as desired, be configured to comfortably accommodate a hand grasped thereabout.

The laterally opposed lengths or lines, outward of the bight, are extended in opposite directions through the opposed ends of the hollow supports, crossing each other within the supports and ultimately extending through and crossing each other within the second handle. Such an arrangement results in a pair of opposed line runs laterally retained and stabilized by the substantially rigid handles and supports. The crossing engagement of the lines within the supports and second handle comprises the means whereby the supports and handle are mounted to the line runs for both adjustable positioning along the length thereof and a stable fixing thereof in an adjusted position upon a tensioning of the line runs between the handles.

The free remote ends of the line lengths beyond the second handle are releasably secured by appropriate means, preferably a knot, for example a square or reef knot, which, while providing for a positive joinder of the lengths, is readily released. As will be recognized, when the device or sling is to be extended to its maximum length, the free end portions of the lengths will be knotted or otherwise joined at the extreme ends thereof. When a shorter device is desired, the supports and second handle are suitably longitudinally slid along the opposed line runs with the line lengths knotted immediately adjacent the outer side of the second handle. The portions of the line lengths beyond the knot can, as desired, be wrapped about the second handle, tucked between the sling and load, or, as will probably be preferred, allowed to dangle downward from the second handle.

Through a varying of the position of the rigid supports relative to the handles, it will be recognized that the handles can be provided at different effected heights relative to the opposite sides of a load.

The slidable mounting of the supports and second handle to the line runs also enables these members to be conveniently slid to one end of the device against the first handle with the projecting line lengths wrapped about the rigid members or tightly coiled adjacent thereto to provide for a compact package readily carried or stored.

Other features, objects and advantages of the invention will become apparent from the details of the invention as more fully hereinafter presented.

BRIEF DESCRIPTION OF THE DRAWINGS

FIG. 1 is a perspective view of the carrying device engaged with a mattress for support and carrying thereof;

FIG. 2 is a plan view of the separate components which combine to form the carrying device;

FIG. 3 is a plan view of the assembled carrying device with portions broken away for purposes of illustration;

FIG. 4 is an elevational view of the carrying device adjusted to both accommodate a different shape load and providing for different height handles;

FIG. 5 is a bottom plan view of the carrying device mounted to a load; and

FIG. 6 is a plan view of the carrying device completely collapsed for storage.

DESCRIPTION OF PREFERRED EMBODIMENT

Referring now more specifically to the drawings, FIG. 1 illustrates the carrying device or sling 10 with a mattress or similar load 12 vertically positioned thereon and therein for a convenient carrying of the load by persons gripping the carrying device at the opposite ends thereof. The vertically positioned load 12, as illustrated, presents a lower support edge and opposed vertical edges.

The carrying device 10 is formed of five elements, an elongate flexible cord 14, first and second handles 16 and 18, and at least two intermediate supports 20.

The handles and supports are duplicate or substantially duplicate hollow elongate tubular members approximately 3⅜ inches long and preferably formed of an appropriate rigid or substantially rigid synthetic resinous material. Each of the tubular elements or members has an axial passage therethrough opening through opposed ends thereof. The handles 16 and 18 in particular may have the outer surfaces thereof configured to define a comfortable hand grip or grasping surface which conforms to the hand of a user of the device 10.

Noting FIGS. 2 and 3, the carrying device or sling 10 is formed by initially folding the cord 14 in half to form an open ended loop consisting of two lines or cord lengths 22 with a bight or bight portion 24 therebetween and with a pair of opposed free cord end portions 26.

The first handle 16 is threaded onto the cord 14, by extending one of the cord lengths 22 through the handle passage, and positioned over the bight portion 24 transversely between the corresponding end portions of the cord lengths 22. The first handle 16, thus, in addition to functioning as a handle, is an effective spacer for the two cord lengths 22.

The two cord lengths 22, outward of the first handle 16, are then extended through the opposed ends of the passage of a first hollow support 20, freely crossing each other within the passage and subsequently extending from the opposite ends of the support. The cord lengths are subsequently similarly extended through at least one additional support 20. Beyond the last support 20, the cord lengths 22 are introduced through the opposed ends of the passage through the second handle 18, freely crossing therein with the free outer end portions 26 projecting from the opposite ends of the second handle 18. The supports 20 and second handle 18, similar to the first handle 16, also laterally space the intermediate portions of the cord lengths 22 which combine to define a pair of laterally spaced elongate line runs 28.

The weaving of the cord lengths or lines 22 through the supports 20 and second handle 18 allows for a convenient longitudinal shifting or sliding adjustment of the sliding supports and handle longitudinally along the opposed runs 28 with the lines, in the absence of tension thereon, freely sliding through the rigid members. Once the desired length of carrying device or sling 10 is achieved, the end portions 26 of the lines 22 beyond the second handle 18 are releasably secured or interlocked by appropriate means, for example a simple square or reef knot 30 which provides for a positive joining of the lines immediately outward of the second handle 18, while at the same time allowing for ready release thereof. After a fixing of the linear extent of the carrying device 10, for example to accommodate the lower longitudinal support edge of a mattress as in FIG. 1 or the lower transverse support edge thereof as in FIG. 4, the intermediate supports 20 are similarly adjusted to achieve optimum load support.

As also suggested in FIG. 4, the supports 20 can be positioned relative to the handles 16 and 18 to provide for a positioning of the handles, at the opposed vertical edges, at different heights to compensate for height differences between carrying partners. Similarly, differences in the height of the handles will facilitate a carrying of the mattress or the like up or down stairs.

While the supports and handles are freely adjustable along the cord lengths 22 in the absence of any significant tension in the cord lengths or more particularly the line runs 28 defined thereby, the positions of the handles and supports, and in particular the supports are substantially fixed or stabilized upon a longitudinal tensioning of the line runs 28 through a frictional binding of the lines within the supports and handles, and, more particularly at the opposed ends of the through passages wherein the lines angularly change direction from a transverse extent to a longitudinal extent and bind to the corresponding edges of the supports and handles.

The actual tensioning of the line runs 28 to fix the position of the elements will be effected automatically upon a grasping of the opposed handles and a raising of the carrying device 10 with a load 12 positioned thereon.

As will be noted in FIGS. 1, 4 and 5, the opposed cord or line runs, beyond the outermost supports 20, extend along the opposed outer faces of the load 12 to the corresponding handle 16, 18, thus providing for a degree of lateral stability. The preferred length of the supports and handles is contemplated to be less than the thickness of a standard mattress and/or box spring. As such, the opposed line runs 28, as they engage about the opposed end portions of the load, also exert an inward compression of the load resulting from a tensioning of the carrying device through a raising of the opposed handles. Further, inasmuch as the carrying device is to be lifted by only one hand of each of the carrying partners, the second hand can be used to stabilize the load.

A further significant advantage of the full length adjustability of the carrying device 10 is the ability of the device to completely collapse into a neat small package easily carried on one's person, or stored in a drawer or the like. This feature of the invention is illustrated in FIG. 6 wherein the supports and second handle have been slid along the full extent of the opposed runs to intimately stack against the first handle 16 at the bight portion. The free end portions of the opposed lines, which now constitute substantially the entire length of the lines, can then be neatly coiled together and retained by an appropriate tie means, or alternately wrapped about the support and handle elements.

The carrying device of the invention is structurally unique in providing for an infinite range of adjustment, that is adjustment not limited to fixed preset positions, with regard to the length of the carrying device, the positioning of the rigid intermediate supports and the height of the handles relative to each other. Also particularly significant with regard to the full range of adjustability of the device is the integral means for releasably fixing the length of the carrying device in the nature of a knot defined between the free end portions of the lines, and the integral means for fixing the position of the intermediate supports along the linear extent of the carrying device in the nature of the frictional binding between the tensioned line runs and the edges of the supports at the opposed ends of the through passages.

Also unique to the present invention is the completely collapsible nature of the carrying device with the rigid elements and flexible cord stored in a non-tangling manner in a compact package.

As will be appreciated, and within the scope of the invention, variations in the disclosed embodiment of the invention, for example in the length of the various components, the number of intermediate supports, the configuration of the handles, and the like are also contemplated.

I claim:

1. A carrying device for vertically positioned loads such as mattresses and the like oriented to provide a lower support edge and opposed vertical edges; said carrying device comprising laterally spaced elongate flexible line runs defining a linear extent with opposed first and second ends, first and second hollow rigid tubular handle means extending transversely between said line runs respectively at said opposed first and second ends, hollow rigid tubular support means extending transversely between said line runs intermediate said first and second ends, and means for engaging said line runs through said first hollow rigid tubular handle means and said second hollow rigid tubular handle means and through said hollow rigid tubular support means for infinite adjustment of said hollow rigid tubular support means along said line runs for varying the position of said hollow rigid tubular support means and for releasably fixing said hollow rigid tubular support means in selected positions along said linear extent for accommodation of said carrying device to loads of various lengths, said first hollow rigid tubular handle means positionable transversely across a first vertical edge of said vertically positioned load, said second hollow rigid tubular handle means positionable transversely across a second vertical edge of said vertically positioned load, and said hollow rigid tubular support means positionable to underlie said lower support edge of said vertically positioned load.

2. The carrying device of claim 1 including means for varying the length of said linear extent and the distance between said first and second ends.

3. The carrying device of claim 2 wherein said support means comprises a plurality of supports each independently moveable along said line runs.

4. The carrying device of claim 3 wherein said means for engaging said line runs comprises passage means through each support, said line runs being formed by a pair of elongate flexible cord lengths with joined first ends at said first end of said linear extent, each cord length extending from said joined first ends to a first support and through said passage means therein, each cord length extending from said first support to each subsequent support and through said corresponding passage means therein, each cord length, beyond said supports, forming free cord end portions, said means for varying the length of said linear extent comprising means for releasably interlocking said free cord end portions at said second end of said linear extent.

5. The carrying device of claim 4 wherein said supports are elongate tubular members with said passage means extending longitudinally therethrough transversely to and between said line runs, each said cord length, at each support, extending transversely between said flexible line runs, said cord lengths between the supports and between the supports and the handle leans extending along said linear extent and defining said line runs.

6. The carrying device of claim 5 wherein said first handle means comprises a first generally rigid handle member including passage means therethrough receiving said joined first ends of said cord lengths, said second handle means comprising a second generally rigid handle member including passage means receiving said free cord end portions therethrough inward of said means interlocking said free cord end portions.

7. The carrying device of claim 6 wherein each handle member is an elongate tubular member with the corresponding passage means extending longitudinally therethrough.

8. The carrying device of claim 7 wherein the joined first ends of said flexible cord lengths are integral and form a bight portion between the cord lengths.

9. The carrying device of claim 6 wherein said means releasably interlocking said free cord length end portions comprises a knot between a joining said free cord end portions.

10. An adjustable carrying device for vertically positioned loads such as mattresses and the like oriented to provide a lower support edge and opposed vertical edges; said carrying device comprising an elongate flexible cord centrally folded and defining two liens with a bight portion therebetween, said bight portion defining a first handle area, said first handle area including a first rigid tubular handle, at least first and second spaced rigid tubular supports generally parallel to and spaced from said first rigid tubular handle, each said rigid tubular support and said first rigid tubular handle having a passage defined therethrough, each passage having opposed open ends, said lines extending from said opposed ends of said passage of said first rigid tubular handle thereof and crossing each other in each of said passages of said rigid tubular supports, said lines extending generally parallel to each other between said rigid tubular supports and parallel to each other between said rigid tubular supports and said bight portion and said first rigid tubular handle, whereby said rigid tubular supports mount to and are slidably adjustable along said lines for frictional retention in adjusted positions along siad lines, said two lines, beyond said rigid tubular supports and remote from said bight portion and said first rigid tubular handle, each terminating in a free end portion, and means connecting said free end portions of said two lines to define a second handle area including a second rigid tubular handle, said second rigid tubular handle generally parallel to and spaced from each of said rigid tubular supports and said first rigid tubular handle, said first rigid tubular handle positionable separately on one of said opposed vertical edges of said vertically positioned load and said second rigid tubular handle positionable separately on the other of said opposed vertical edges of said vertically positioned load, and said at least first and second spaced rigid tubular supports positioned to provide lower support of said vertically positioned load.

11. The carrying device of claim 10 including first and second handles mounted to said lines respectively at said first and second handle areas.

12. The carrying device of claim 11 wherein said first handle has a passage therethrough receiving said bight portion of said cord, said second handle having a passage therethrough with opposed open ends receiving said lines in opposite directions therethrough for slidable adjustment of said second handle along said lines.

13. The carrying device of claim 12 wherein said free end portions, beyond said second handle, are tied into a releasable knot, said knot comprising said means connecting the free end portions.

14. The carrying device of claim 12 wherein said first and second handles have hand conforming gripping surfaces defined thereon.

* * * * *